United States Patent [19]

Grimm

[11] Patent Number: 4,549,162
[45] Date of Patent: Oct. 22, 1985

[54] INSULATING HOUSING FOR A SURFACE TEMPERATURE THERMOMETER

[75] Inventor: Dieter Grimm, Schoneck, Fed. Rep. of Germany

[73] Assignee: Degussa Aktiengesellschaft, Frankfurt am Main, Fed. Rep. of Germany

[21] Appl. No.: 567,347

[22] Filed: Dec. 30, 1983

[30] Foreign Application Priority Data

Jun. 21, 1983 [DE] Fed. Rep. of Germany ... 8317881[U]

[51] Int. Cl.⁴ .......................... G01K 1/08; H01C 7/00
[52] U.S. Cl. ...................................... 338/28; 374/138; 374/208
[58] Field of Search ............... 374/163, 208, 188, 153, 374/109, 138; 136/230; 338/28

[56] References Cited

U.S. PATENT DOCUMENTS

| | | | |
|---|---|---|---|
| 2,022,515 | 11/1935 | Orchard | 136/221 X |
| 2,322,501 | 6/1943 | Barnitz | 374/153 X |
| 2,422,124 | 6/1947 | Obermaier | 136/221 |
| 2,517,674 | 8/1950 | Kahl | 374/208 |
| 3,395,050 | 7/1968 | Senbokuya | 136/221 |
| 3,573,995 | 4/1971 | Senbokuya | 136/230 |
| 4,142,170 | 2/1979 | Blatter | 338/28 |
| 4,420,738 | 12/1983 | Rehmann et al. | 338/28 |

Primary Examiner—Daniel M. Yasich
Attorney, Agent, or Firm—Cushman, Darby & Cushman

[57] ABSTRACT

A rapidly responding, electric thermometer for measuring surface temperatures is described which permits only a minimum heat transfer of temperature. The thermometer consists of a housing open at the bottom in which, ending with the lower edge of the housing, a temperature sensor is embedded by means of a poorly heat conducting material. The heat transfer between the lower part of the housing and the upper part of the housing is suppressed to a great extend with several radial slits in the housing which allow only two or more bridges to remain standing.

2 Claims, 2 Drawing Figures

INSULATING HOUSING FOR A SURFACE TEMPERATURE THERMOMETER

BACKGROUND OF THE INVENTION

The invention relates to a rapidly responding, electric thermometer for measuring surface temperatures in which a temperature sensor is attached by means of a poor heat conducting mass in a housing open at the bottom and made of a poor heat conducting material ending with the lower edge of the housing.

In the measurement of temperatures with electric thermometers on surfaces, a quick recording of the temperature not deviating from the actual surface temperature is sought which, however, can only rarely be achieved in practice. Depending on the design of the thermometer, great differences may result between the recorded and the actual temperature. The causes for this may lie in an insufficient attachment of the temperature sensor on the surface to be measured as well as in the construction of the thermometer, especially in the too strong heat conduction from the temperature sensor to the thermometer housing which has a relatively great mass.

Rapidly responding, electrical thermometers are known in which the temperature sensor is attached at the lower edge of a housing by means of a poor heat conducting mass. But even in the case of this construction of the thermometer, the heat transfer from the temperature sensor to the housing is still so great that the measured temperature values may deviate considerably from the actual temperatures.

It, therefore, was the problem of the present invention to create a rapidly responding electrical thermometer for the measurement of surface temperatures in which a temperature sensor is attached by means of a poor heat conducting mass in a housing open on the bottom and made of a poorly heat conducting material ending with the lower edge of the housing which only permits a minimal discharge of heat from the temperature sensor to the housing.

SUMMARY OF THE INVENTION

This problem was solved according to the invention by providing the housing above the temperature sensor with two or more radial slits in such a way that the lower part of the housing delineated by the slits is connected with the upper part of the housing only by two or more bridges.

Preferably, a layer measuring resistance is used as a temperature sensor.

For the housing, there is advantageously used a relatively poor heat conducting material in which radial slits are made so that only two or a few bridges remain standing, with a cross section which, to be sure, ensures the mechanical stability of the housing, on the other hand, however, eliminates the heat transfer from the temperature sensor to the upper part of the housing to the greatest extent. The slits are made as close as possible above the temperature sensor in order to keep the mass of the lower part of the housing small.

DETAILED DESCRIPTION

Figure 1:
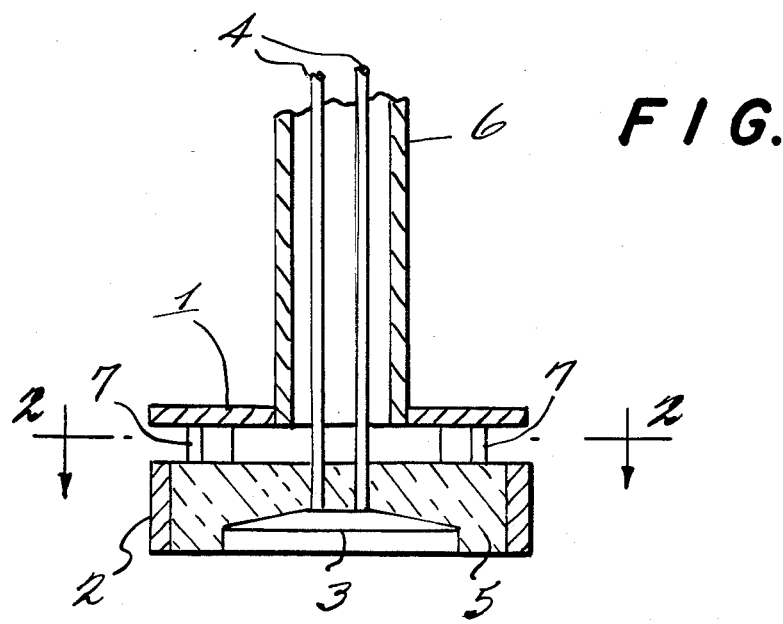
FIG. 1 shows schematically in longitudinal section an embodiment by way of example of the electric thermometer according to the invention.
Figure 2:
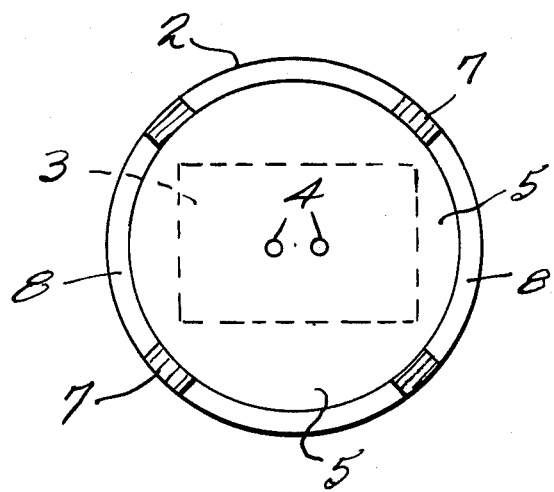
FIG. 2 shows schematically in cross section the electrical thermometer.

As shown in the drawings, the thermometer consists of (or consists essentially of) a temperature sensor (3) with feed lines (4), which is inserted by means of a poor heat conducting mass (5) in a housing (1). Above the temperature sensor (3), the housing (1) is provided with slits (8) so that the lower part (2) of the housing is connected with the upper part (6) of the housing merely by way of the bridges (7). As a result of that, the heat transfer from the temperature sensor (3) via the lower part (2) of the housing, which has little mass, to the upper part (6) of the housing is largely prevented.

The electric thermometers according to the invention show a very fast responding behavior, whereby the difference between recorded and actual surface temperature is minimal.

What is claimed is:

1. In a rapidly responding electric thermometer for the measurement of surface temperature including a housing having a first portion with said first portion having a temperature sensor located in a recess in said first portion and said first portion being constructed from a poor heat conducting material, said housing having a second portion through which lines for said temperature sensor extend, said second portion being insulated from heat transfer from said first portion by slits formed in said housing with said slits isolating said portions except for at least two bridges connecting said portions.

2. A rapidly responding, electric thermometer according to claim 1 wherein a layer measuring resistance is inserted as the temperature sensor.

* * * * *